United States Patent
Czerniak et al.

(10) Patent No.: US 9,395,270 B2
(45) Date of Patent: Jul. 19, 2016

(54) METHOD AND SYSTEM FOR MONITORING ROTOR BLADES IN COMBUSTION TURBINE ENGINE

(71) Applicant: Florida Power & Light Company, Juno Beach, FL (US)

(72) Inventors: Paul Czerniak, North Palm Beach, FL (US); Elizabeth C. Day, Covington, KY (US); Paul V. Sickles, Verona, KY (US)

(73) Assignee: Florida Power & Light Company, Juno Beach, FL (US)

( * ) Notice: Subject to any disclaimer, the term of this patent is extended or adjusted under 35 U.S.C. 154(b) by 754 days.

(21) Appl. No.: 13/655,832

(22) Filed: Oct. 19, 2012

(65) Prior Publication Data

US 2014/0114587 A1  Apr. 24, 2014

(51) Int. Cl.
*G06F 19/00* (2011.01)
*G01M 13/02* (2006.01)
*G05B 23/02* (2006.01)

(52) U.S. Cl.
CPC ......... *G01M 13/028* (2013.01); *G05B 23/0283* (2013.01)

(58) Field of Classification Search
USPC .......................................................... 702/34
See application file for complete search history.

(56) References Cited

U.S. PATENT DOCUMENTS

| | | | |
|---|---|---|---|
| 3,502,967 A | 3/1970 | Bridges et al. | |
| 4,951,500 A | 8/1990 | Twerdochlib et al. | |
| 4,955,269 A | 9/1990 | Kendig et al. | |
| 5,365,787 A | 11/1994 | Hernandez et al. | |
| 5,974,882 A | 11/1999 | Heath | |
| 6,092,029 A | 7/2000 | Bently | |
| 7,509,862 B2 | 3/2009 | Cohen et al. | |
| 7,677,090 B2 | 3/2010 | Moen | |
| 7,856,337 B2 | 12/2010 | Kulczyk et al. | |
| 2009/0177363 A1 | 7/2009 | Kulczyk et al. | |
| 2009/0301055 A1 | 12/2009 | Kallappa | |
| 2009/0319206 A1 | 12/2009 | Russhard et al. | |
| 2010/0030493 A1 | 2/2010 | Rao | |
| 2010/0153031 A1 | 6/2010 | Russhard | |
| 2010/0161245 A1* | 6/2010 | Rai et al. | ............ 702/35 |
| 2010/0171491 A1 | 7/2010 | Chana | |
| 2010/0179775 A1 | 7/2010 | Loftus | |
| 2011/0010108 A1 | 1/2011 | Bhattacharya et al. | |

FOREIGN PATENT DOCUMENTS

| | | |
|---|---|---|
| JP | 9310604 | 12/1997 |
| JP | 2000321122 | 11/2000 |

OTHER PUBLICATIONS

Chun Kau Cheung, Small Wind Turbine Blade Sensor for Condition Based Maintenance, A Thesis presented to the Faculty of California Polytechnic University San Luis Obispo, Sep. 2011, 190 pages.*

(Continued)

*Primary Examiner* — Tung S Lau
(74) *Attorney, Agent, or Firm* — Feldman Gale, P.A.

(57) ABSTRACT

In accordance with one embodiment, a method for monitoring the health of blades in a combustion turbine engine is provided. Sensors mounted around the circumference of a rotor sense and record the passage of blades during turbine operation. Analysis of information from the sensors indicates whether a blade is damaged. Analysis of blade vibration and amplitude, as measured by the sensors, is used to predict the number of cycles the blade can undergo before replacement or maintenance.

20 Claims, 7 Drawing Sheets

(56) References Cited

OTHER PUBLICATIONS

Salhi, B. et al.; "A subspace approach for the analysis of blade tip timing data;" 12$^{th}$ IFToMM World Congress; Jun. 18-21, 2007; pp. 1-6; Besancon-France.

"Non-Intrusive Stress Measurement Systems;" Agilis Measurement Systems; Feb. 1, 2011; pp. 1-2.

Ohio Aerospace Institute; "Blade Tip Deflection;" The Propulsion Instrumentation Working Group PIWG; Nov. 12, 2010; p. 1.

Lyon, Donald; "How does your turbine blade health measure up?;" Monitran Technology; Sep. 1, 2008; pp. 1-3.

* cited by examiner

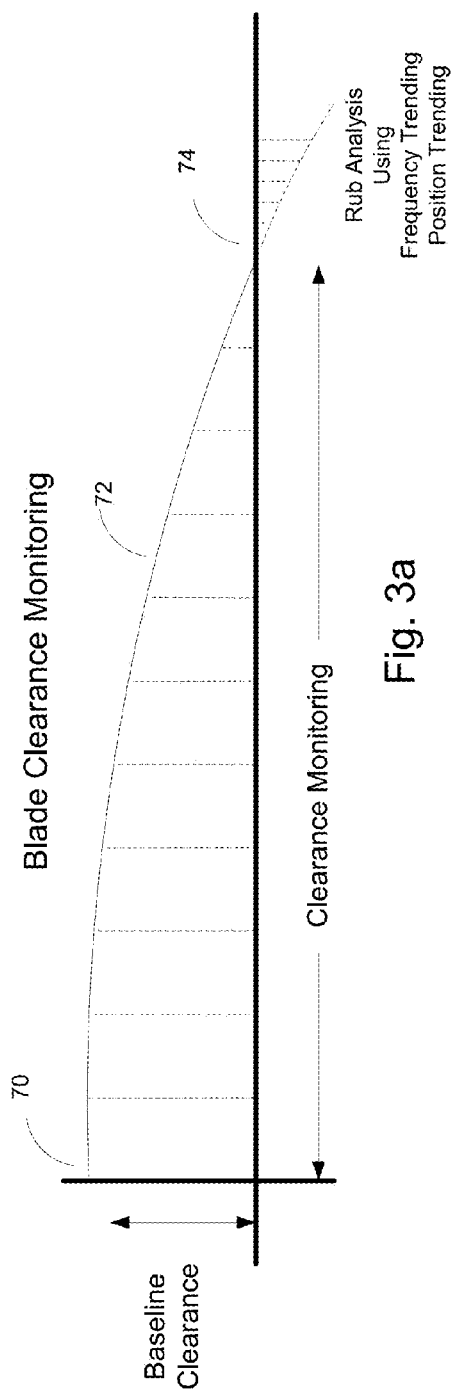
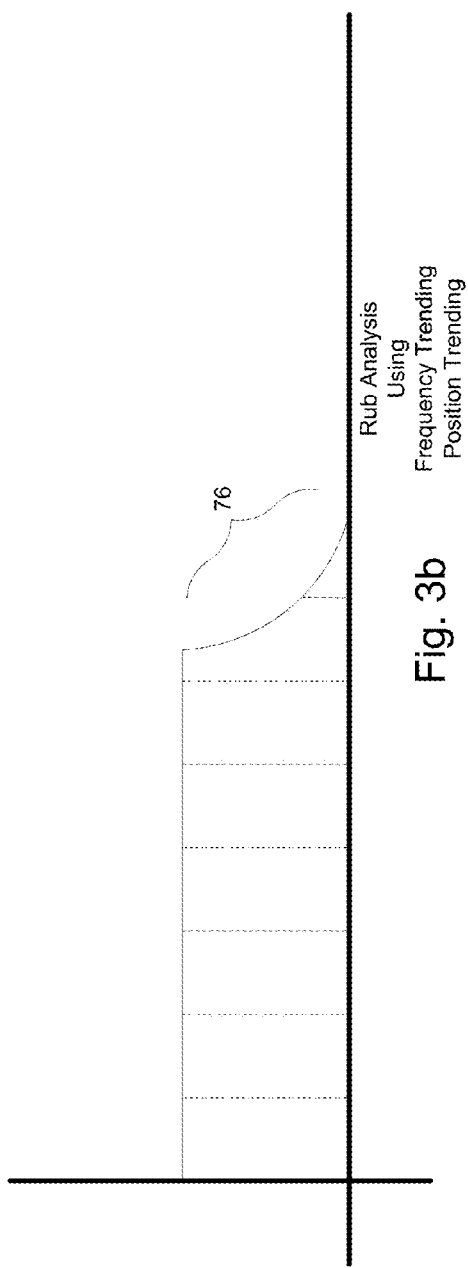

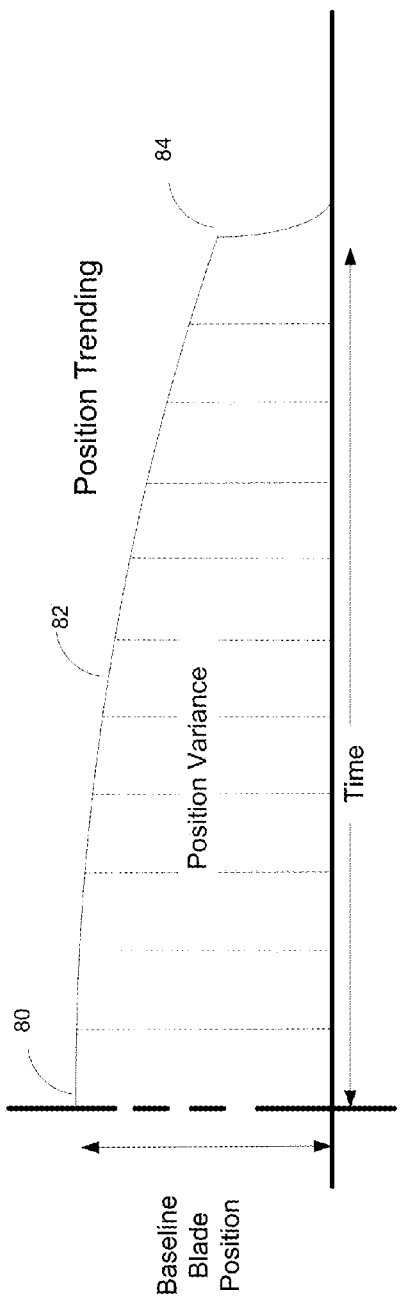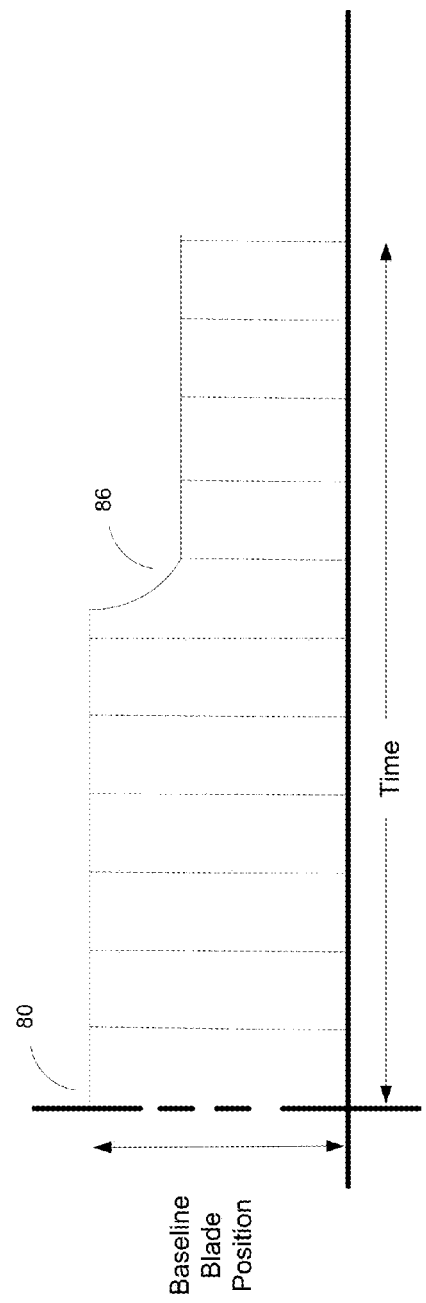

METHOD AND SYSTEM FOR MONITORING ROTOR BLADES IN COMBUSTION TURBINE ENGINE

BACKGROUND OF THE INVENTION

Turbine engines are used in many industrial applications in which a mechanical driving force is needed to produce a useful result. One of the most visible applications is in the generation of electricity where so-called "green" resources such as hydro-electric, wind turbine, or solar photovoltaic power are not available. Even where such resources are available, they typically lack the flexibility to rapidly increase or decrease the supply of electricity as demand fluctuates, whereas turbine engines do have such flexibility. Accordingly, although green resources are becoming more prevalent, and may be expected to assume an ever-increasing share of electrical power generation, it is anticipated that the use of turbine engines will continue into the indefinite future. That being so, there is a continuing need to continue to automate, streamline, and increase the efficiency of systems in which turbine power plays a significant role. One of the areas in which automation and efficiency may be enhanced is in the planning and scheduling of maintenance that may be due to causes other than normal wear and tear. Even new or newly refurbished turbine engines may have their life expectancies shortened by the incidence of unexpected damage to rotor or stator blades caused by the ingestion of foreign objects, or by latent manufacturing or assembly defects that become evident only when the engine is being operated.

Embodiments of the present invention generally relate to rotor blades in combustion and steam turbine engines, both of which are extensively used in the generation of electrical power, and more particularly to systems and methods for monitoring the health of such blades. Rotor blades or rotating blades are used in many devices with several examples including compressors, turbines, and engines. A gas (or combustion) turbine engine typically includes a compressor section, a combustor section, and a turbine section. The compressor and the turbine sections generally include rows of blades that are axially stacked in stages. Each stage includes a row of circumferentially-spaced stator blades, which are fixed, and a row of rotor blades, which are attached to and rotate with a central axis or shaft. In operation, the compressor rotor blades rotate and, acting in concert with the stator blades, compress a flow of air. The supply of compressed air then is used in the combustor to combust a supply of fuel. The resulting flow of hot expanding gases from the combustion, i.e., the working fluid, is expanded through the turbine section of the engine. The flow of working fluid through the turbine blades turns the central shaft that the turbine blades are attached to and that, in turn, causes the rotor blades to rotate. A steam turbine engine does not require a compressor section, as the transformation of water to steam provides the expanding gas necessary to rotate the turbine and provide torque to turn the shaft.

In either case, the energy contained in the fuel is converted into the mechanical energy of the rotating shaft, which may be attached to the coils of an electrical generator such that electrical power is generated. During operation of combustion turbine engines, because of the extreme temperatures of the hot-gas path, the velocity of the working fluid, and the rotational velocity of the engine, compressor blades, which generally include both the rotating rotor blades and the fixed stator blades, become highly stressed with extreme mechanical and thermal loads. Steam turbine engines experience similar mechanical and thermal stresses to rotor blades in the turbine section of the engine.

Various factors adversely affect health of the rotor blades and lead to fatigue, stress, and ultimately cracking of the rotor blades. These include not only the mechanical and thermal loads mentioned earlier, but also any damage that may occur when external objects or debris are inadvertently sucked into the compressor of an operating engine, or internal components become dislodged. Such damage, frequently referred to as foreign object damage ("FOD") or domestic object damage ("DOD"), can chip, bend, or weaken one or more rotor blades such that the blade or blades will fail before their expected lifespan in the absence of such damage. In some instances, blades may be affected in a manner that causes the tip of a blade to scrape or rub against the interior wall of the engine casing. Once a blade tip begins to rub, the blade may develop cracks or other damage that can be used to predict failure. By monitoring the health of each blade in a turbine engine, unexpected failures may be avoided or substantially mitigated, and maintenance can be scheduled to correct blade defects before a catastrophic failure occurs.

Given the extreme conditions of operation for rotor blades, it is important for rotor blade health to be monitored closely. In many cases, blade failures may be predicted and avoided if data concerning blade damage is accurately collected and monitored. Such data may include strain levels and/or crack formation/propagation in certain highly stressed areas on the blade. Blade health monitoring is typically done using sensors embedded in the casing of a turbine engine that precisely measure the passage of the tip of a rotating blade. By using a plurality of sensors placed at precise locations around the circumference of a rotor stage, vibrational characteristics of each blade can be measured, recorded, and analyzed, and determinations made about the health of each blade.

It is well understood that blades in an operating turbine have resonant vibration frequencies that depend on a number of parameters, including the characteristics of the blade material, blade size, rotational speed, and a variety of other factors. In this context, the term "resonant vibration frequency" refers to the vibration frequency of a blade under operational conditions, and does not refer to the rotational frequency of the shaft to which the blade is attached. Resonant vibration frequencies of blades in an undamaged engine can be determined empirically and monitored during start-up, shut-down, and normal operation. A change in the resonant frequencies of a blade is usually indicative of damage to the blade, and such frequency variations may be regarded as warning flags that a blade's health may be deteriorating. Once a blade develops a crack, changes in the resonant frequencies of the blade can be used to track the progression of the crack. As a crack grows in length, the time to blade failure will decrease, and predictions regarding remaining blade life may be made, based upon the rate of growth of the crack. Thus, with adequate monitoring and the use of algorithms to analyze blade vibration data, a blade's life expectance may be estimated, and appropriate steps be taken to replace the blade without adversely impacting other system operations.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an overview of the invention, the system detects blades vibrating at abnormal resonant frequencies caused by secondary damage by detecting the event. The events are detected by any of several methods, depending upon the cause of the damage. In the event that damage is caused by a blade rubbing against the engine casing, the blade vibrations will resonate erratically for a short period after the event. The system will pick up the erratic signature and the algorithm will then begin to calculate the remaining life of the blade. In the event of a crack, or of corrosion or FOD/DOD damage, the blade will develop a different vibration signature which will cause a permanent change in the frequency. The permanent change will trigger the algorithms to begin a calculation to predict useful remaining blade life. Once the algorithms are triggered the system counts and records the number of times the blade vibrates at a peak resonance frequency during the startup-run-shutdown cycle. Blade replacement recommendations are determined by the number of times a blade is detected vibrating at a peak resonant frequency plotted on a normalized Goodman diagram for the type of damage or by the number of times it is detected vibrating at a resonant frequency that shows differences to its predicted baseline natural resonant frequency response. As the number of peak vibration episodes increases, the need for replacing the blade becomes greater. An empirical model using Finite Element Model results combined with historical experience provides a reference for determining when a blade has experienced enough peak amplitudes that replacing it is indicated. If damage should occur while the turbine is in steady state running condition, it will be manifested by the presence of peak amplitudes that were not present at an earlier time.

In accordance with one embodiment, a system and method for monitoring blade health in a turbine engine is provided. The system for monitoring blade health includes a plurality of sensors to collect data from which blade vibration frequency, and resonant blade frequencies, may be determined. Although any instrumentation system that precisely monitors and records blade passage times may be used to monitor blade health, in an exemplary embodiment, the system may use an arrival time analysis ("ATA") health monitoring instrumentation system such as that provided by Agilis Engineering, Inc., to provide precise data regarding the passage of rotor blade tips, or parts of rotor blade tips (e.g., leading edge, midpoint, or trailing edge) proximate to one or more sensors mounted within the engine casing. Because of the extreme heat generated in the turbine section of a combustion turbine engine, sensors for such engines will normally be mounted within the compressor section, and will monitor the health of rotor blades in the compressor. In steam turbine engines, which do not require compressors and which typically operate at lower temperatures, sensors may be mounted in the turbine section where the health of rotor blades in the turbine can be monitored.

ATA system sensors, which may be eddy current sensors, proximity sensors, or any other suitable sensor, and associated instrumentation can sense the passage of each blade and store data related to the relative positions of parts of a blade without coming into direct contact with any blade. Blade arrival data is collected for each blade from an undamaged engine and is stored for later retrieval and analysis. Precise arrival times may be recorded for various parts of a blade, such as leading edge, midpoint, trailing edge, or the like. If a blade thereafter incurs twisting or torsional damage that changes its shape or orientation, analysis of historical data prior to the onset of damage and comparison with recent data collected after damage was incurred, may indicate changes in the blade's shape or orientation resulting from damage, or may reveal changes in a blade's vibration frequency which may be indicative of the presence or propagation of cracks in the blade. Data extracted from the system may be further processed to provide an indication of remaining blade life.

The system may include a processing module to process the blade health data and to store the analysis data on a non-transitory computer readable medium. The system may be configured to use the stored analysis data to schedule shutdown of the engine. Optionally, the system may also check inventory for parts needing repair or, when the parts are not available may automatically place orders for the non-available parts. In an embodiment of the subject matter disclosed herein, the system may schedule hardware inspection during normal shutdown of the engine, and blade repair specialists for inspection of the blade. The system may also catalog every action for future references to data and actions performed by the system. In yet another embodiment, the system may be configured to allow manual correction, overwriting, or editing of any action.

One attribute of the invention is that real-time measurements are processed using multiple algorithms and logic to consider different blade health indicators simultaneously. The multifaceted processing approach is intended to provide redundancy in the detection and predictive capabilities of the invention. Feedback on predictive analytics is available through direct blade measurement such as frequency trending. Such redundancy minimizes operation risks through direct response trending while offering predictive capabilities for maintenance and unit operation planning.

The invention relies on processed data acquired by the ATA engine instrumentation system. This data includes:
  Vibration frequencies for each blade being monitored
  The amplitude of vibrations at resonant frequencies
  Number of cycles (start-up/shut-down) for each blade
  Tip positions (leading edge, middle, trailing edge) of each blade
  Radial clearances for each blade
  These files are frequently updated to the system's database depending on the blade response and vibration amplitude threshold levels set within the ATA system. From this data, blade monitoring algorithms can be applied to determine:
  Frequency trending
  Clearance monitoring
  Position trending
  Damage tolerance
  Damage accumulation
  In addition to the processed ATA instrumentation system data, a number of static input files are also used in the invention. These files include:
  Stress input files from ANSYS finite element analyses
  Material allowables
  Calibration constants used to relate measured deflections and stress predictions
  Surface condition assumption inputs
  Blade revision control settings
  These files are considered static (unchanging) except as needed to calibrate calculations and to account for physical changes made to the rotor blades (repairs, replacement, etc.). For example, capability is provided to account for unique blades within the system so long as the stress input files are updated with the corresponding analysis results. Static files may be created from data collected from the turbine engine being monitored at a time when it was in a new and undamaged state, or they may include empirical historical data collected from similar engines operating under similar circumstances. In this manner, the collective experience of operators of the same model turbine engines may be pooled and used to establish predictive damage models for various kinds of damage events.

Once the static input files are installed, the system can operate on the incoming ATA system data. Calculations are performed within the system's database to evaluate blade life consumption (fatigue life) and crack propagation (fracture mechanics) based on measured blade responses. Frequency and relative position shift information is also imported from the ATA system and stored in the system's database. Calculated summary results are provided, along with select historical data for display and for alerts within the system. Additionally, a graphical user interface (GUI) is provided to allow the turbine engineers and operators access to detailed historical information, projections, and trend data.

While the resonant vibration frequency of a damaged blade may be sensed and known, it is not normally the primary parameter used in the calculation of useful life of the blade before replacement. Rather, it is the number of times (i.e., cycles), and the duration of time, that the blade vibrates at its resonant frequency that determines blade life and the need for replacement.

The system of this invention uses existing hardware instrumentation and finite element model algorithms to provide data from which the remaining life of cracked or damaged rotor blades may be predicted. The system is based upon the detection of the onset of a crack or damaged blade. Once a damage location is detected the algorithms are applied to determine the remaining life of the blade. Information used for blade health analysis can be considered in any of five general categories, explained below.

Frequency trending is the monitoring and recording of blade resonant frequency variations. As the resonant frequency of a blade changes, the amount and rate of frequency change can be used to determine the length and rate of growth of a crack in the blade. When cross-referenced with empirical data, which may include the number of cycles, an approximation of when the blade will critically fail may be made.

Clearance monitoring is the tracking and monitoring of blade clearances within the engine casing. Baseline radial clearances are recorded and clearances are monitored for occurrences of tip rubs. Blade tip rubs have been shown to adversely affect the blade tip durability, and may be indicative of other damage to a blade. Blade tip rubs should be inspected and analyzed to assess whether the rubs are of sufficient severity to initiate cracks in the blade.

Position trending monitors and records any deviation in the relative position of a blade with reference to other blades in a stage. Baseline tip positions are recorded when the engine is undamaged, and deviations in blade position are noted. A change in blade position suggests permanent blade distortion which may have been caused by foreign or domestic object damage or the initiation of a crack in the blade. The magnitude and trend of the distortion will indicate the kind and immediacy of response that is appropriate for the condition. Position trending also detects other changes in a blade, such as the relative positions of the blade leading edge, middle section, or trailing edge at various sensing points about the circumference of the casing. Such information may be used to determine torsion or twisting of a blade, or oscillations (flutter) during a blade's rotation about the central shaft of the engine.

Damage tolerance is determined by the vibration amplitude and the number of vibration cycles a damaged blade may experience. Turbine engines used to generate electricity typically operate at a constant speed, and vary from that speed only during startup or shutdown. Vibration cycles are related to engine startup and shutdown, and during the course of a startup or shutdown, a blade may experience a number of resonant vibration frequencies, which are usually indicated by greater-than-normal vibration amplitudes. Both the amplitude of blade vibrations and the number of cycles the blade experiences are factors that may affect expected blade life. Stress intensities are calculated from this information and are used to determine crack growth resulting from each vibration cycle and amplitude. Corrective action time is projected from crack growth rates and prediction of critical crack length.

Damage accumulation provides the existing state of fatigue damage to a blade resulting from vibration. Vibration amplitude and the number of vibration cycles are measured for all responding modes, and damage due to vibration is summed over time. Corrective action time is projected from damage accumulation rates.

It is therefore a purpose of the invention to detect changes in resonant blade frequencies and monitor such changes over time to predict remaining blade life.

It is another purpose of the invention to detect changes in relative blade position with respect to a previous position of a blade or with respect to other blades, or both, and to determine whether a blade has been twisted or bent or has otherwise had its position changed from an earlier measurement.

It is a further purpose of the invention to monitor blade tip clearances or blade tip rubs against an engine casing to determine actual or predicted damage to a blade and to schedule timely maintenance prior to blade failure.

It is another purpose of the invention to determine the damage tolerance of one or more blades in a turbine engine to permit diagnosis and analysis of the health of the engine.

It is yet another purpose of the invention to monitor the accumulation of damage to one or more blades and in a turbine engine to predict remaining time or cycles of operation before corrective action is required.

These and other purposes of the invention are more fully explained in the description of preferred embodiments of the invention.

BRIEF DESCRIPTION OF THE DRAWINGS

In accordance with one embodiment of the invention, FIGS. 3a and 3b show exemplary clearance monitoring graphs from which two failure modes may be determined.

In accordance with one embodiment of the invention, FIGS. 4a and 4b show exemplary position trending graphs from which two types of blade damage may be detected.

DETAILED DESCRIPTION OF THE PREFERRED EMBODIMENTS

Figure 1:
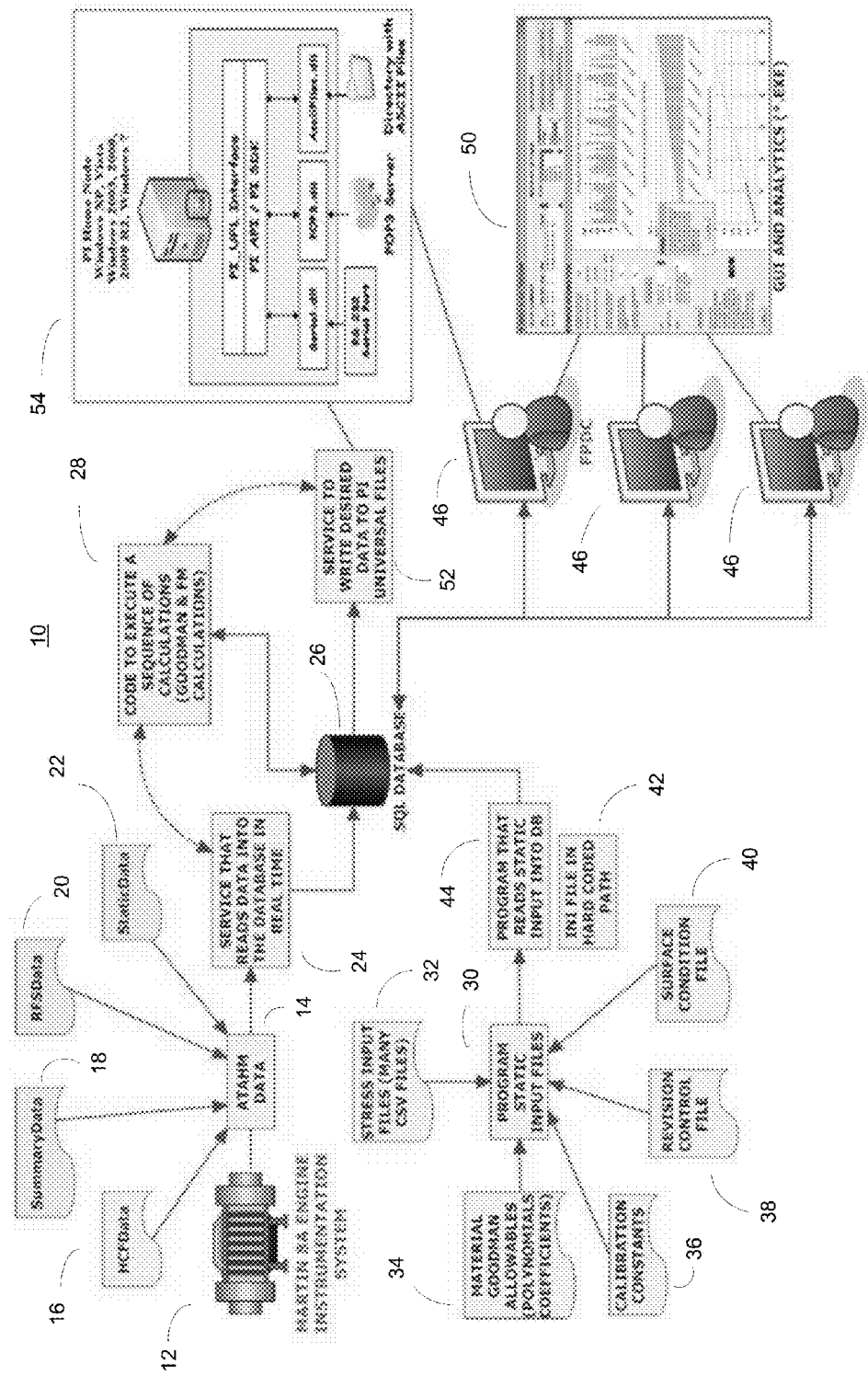
FIG. 1 is a diagrammatic depiction of one embodiment of the overall system and major components.

FIG. 1 depicts the overall system of the invention 10 and the major components within it. A turbine engine 12 is fitted with sensors that provide arrival time analysis ("ATA") health monitoring instrumentation data 14 needed to enable the system to be analyzed.

The ATA system 14 is a non-intrusive stress measurement hardware system that includes a set of probes mounted within the turbine casing for each rotor stage. In a preferred embodiment, eight (8) case mounted probes per stage accurately determine the arrival time of a blade tip at a particular case location. Optical, capacitive and eddy current probes may be used for the arrival time measurement. The probes are placed at unequal, pre-determined distances around the case to record the time of an arriving blade tip, and to track its progress during a rotation. The placement of the probes is dependent upon a number of factors, such as the length and stiffness of turbine blades, and can be determined from a calculation designed to optimize the observation of specific engine parameters.

The arrival time of a blade may be determined by "taking a picture"—that is, recording the outputs from all sensors—for example, every 2 nanoseconds. As the blade approaches a sensor, a part of the blade edge catches the edge of the picture "frame," and the time that that occurs is recorded. The strength (amplitude) of the returning signal determines how much of the blade is being "seen." Assuming that 8 pictures are taken between the time the blade tip first enters into the viewing frame and the time the entire blade is under the frame, and that the amplitudes and times of the 8 pictures taken over the course of a blade encounter are recorded, a curve or line may be fitted to the points. An "event" can be defined as the point of maximum amplitude change, and the corresponding time that this occurred. This method provides highly accurate event descriptions and allows responses to be seen on the sub-1 mil scale. The blade may be said to "arrive" at the point of maximum amplitude change, and the corresponding time that this occurred.

The arrival times of each blade (also known as "tip timing") are converted to blade positions relative to Once Per Revolution (OPR), or "center time" by using the rotational velocity and the radius of the measurements. In the analysis portion, each blade's position is then compared to a precisely calculated "undeflected blade position," to yield a deflection value for each blade. Sensors determine variances in blade passing times and, when taken at multiple points around the casing, enable an analysis of the frequency and amplitude of the vibrations of a blade.

Tip timing, has many capabilities for detection and monitoring of the propagation of blade cracks in turbo machinery. These analysis capabilities include monitoring static blade characteristics such as blade untwist as well as monitoring vibration characteristic such as resonant amplitude, frequency and damping. Trending of these static and vibratory characteristics can be used to detect and monitor propagation of developing cracks in the turbine blades.

In blade tip timing, the center-time for all blades passing a probe is calculated using the arrival times of all the blades and averaging them over 3 revolutions. The time difference between the center time and the actual arrival time for mid-blade edge of a particular blade, as measured by a probe, represents the difference between when the blade should pass and when it actually does.

Data from multiple probes at a common axial location are used to determine the mode frequency of a vibration. Once fit, amplitude and phase data can be calculated along with engine order, peak response rpm, data fit, absolute phase, damping, and other vibratory characteristics. Probes are placed in specific locations around the case of the given application to optimize on certain (pre-specified) engine orders. In this manner, the locations of the probes on the case allow for more accurate data in the regions where resonances are bound to occur.

The deflection measurement is a peak-to-peak measurement derived from the axial and tangential deflections of the rotor blade. The shape of the modes in interest, as well as the probe's axial position on the blade (leading edge, mid blade, trailing edge), determine the sensitivity the system will have to a particular mode.

It is understood that the presence of a crack alters the operating vibration frequency of a blade and, thus, may be used to warn of a compromised blade. As crack length grows, the blade's vibration frequency will change, making it possible to monitor crack length by monitoring blade vibration frequency. When multiple sensors are used, blade vibration frequency can be determined with precision by noting differences, throughout a given rotation cycle, in the relative positions of a blade tip or edge, and a midpoint or leading edge. Such information, coupled with differences in the expected passage time of a blade and actual passage time, can be used to determine a blade's vibration mode and resonant frequencies both before the onset of damage, and during the progression of damage which may be a function of crack length. However, in order for blade health to be monitored, and blade life expectancy to be determined, raw data regarding blade vibration modes and resonant frequencies must be analyzed and processed.

Rotor speed for a turbines powering electrical generators in the United States is typically 3600 rpm except during periods of startup and shutdown, although other steady-state shaft speeds are used in other countries, and, through the use of gearboxes, other steady state shaft speeds may be used where efficiency or design so require. This steady-state shaft speed relates only to the turning of the rotor, and is not to be confused with the vibration frequency of a blade, which is primarily dependent upon factors inherent to the blade and its manufacture. It is the vibration of the blade that is important in determining the predicted life of a rotor blade before replacement.

In an embodiment of the invention, "normal" vibration frequency of blades on a rotor turning at a steady-state shaft speed (for example, 3600 rpm) is sensed and recorded. A blade that has suffered damage will resonate at a different frequency than an undamaged blade. Blades having abnormal resonant frequencies when compared to baseline undamaged blade frequency may be assumed to have some damage. The onset of damage will cause a rapid shift in frequency and will continue to change if the damage and/or crack grows.

As rotor speed is increased during startup from 0 to 1200 rpm to 2400 rpm to 3600 rpm, blade vibration frequency is sensed and recorded. At certain rotor rotation speeds during startup and shutdown, blades will demonstrate natural resonant frequency peaks. The amplitude of blade vibrations at such resonant frequencies is greater than the amplitude of blade vibrations at other rotation speeds, and can be detected and measured. As rotation speed increases, blade vibration frequencies remain within a defined range, but reach peak amplitudes outside of that range at resonant frequencies which occur at certain rotation speeds during startup and shutdown. Peak amplitudes of blade resonant frequencies can be used to calculate stress intensities and to determine the growth of a crack resulting from each vibration cycle at that amplitude. Resonant blade frequencies can cause blade damage, and the time spent at such resonant frequencies should be minimized if possible.

The resonant frequencies of a blade will change if the blade should become damaged. Damage is typically caused by foreign objects inadvertently entering the engine ("FOD") or internal components becoming dislodged ("DOD"), by blades rubbing against the case, and by corrosion. The amount of change in resonant frequency will differ somewhat, depending upon the amount of damage to the blade. Damaged blades are typically identifiable by a difference in amplitudes which set them apart from the vibration frequencies of "normal" undamaged blades. In addition, the onset of damage can be captured by sudden differences in the blade frequency and amplitude.

In FIG. 1, ATA system data 14 includes at least blade resonance frequencies 16 ("HCF" or high cycle fatigue data); instrumentation system summary data 18; resonant frequency shift data 20; and static position data 22. Blade resonance frequencies 16 are useful for determining cycle life projections. At 24, the ATA system data 14 is read into a system database 26 in real time. The system database 26 also maintains tables of additional data in the form of program static input files 30.

Static input files 30 include at least stress input files from finite element analyses 32, material Goodman allowables in the form of polynomials coefficients 34, calibration constants used to relate measured deflections and stress predictions 36, blade revision control setting files 38, and surface condition assumption inputs 40. These files are combined with an initialization file 42, and the combined information is passed to a program 44 that reads the information into the database 26. A module 28 accessible to the database 26 may provide further processing of information in the database as well as processing ATA system data being read into the database 24. Processing module 28 also processes data from the database 26 being written to procedural input universal files 52 or for passage to procedural input module 54. Static input files 30 are essentially unchanged except as needed to calibrate calculations and to account for physical changes made to individual compressor blades. In order to accomplish this, stress input files must be updated with the corresponding analysis results whenever a blade analysis is conducted.

At 28, a sequence of calculations is made on the data to determine Goodman and finite materials information. This information may then be retained in the database 26 where it is available via a GUI 50 to engineers 46 who may use historical information and trend data to make projections regarding the system or to gain operational insight to minimize risk and increase blade life. In addition, selected calculated data may be sent to a procedural input (PI) module 54 where it may be used for outage planning and scheduling.

Figure 2:
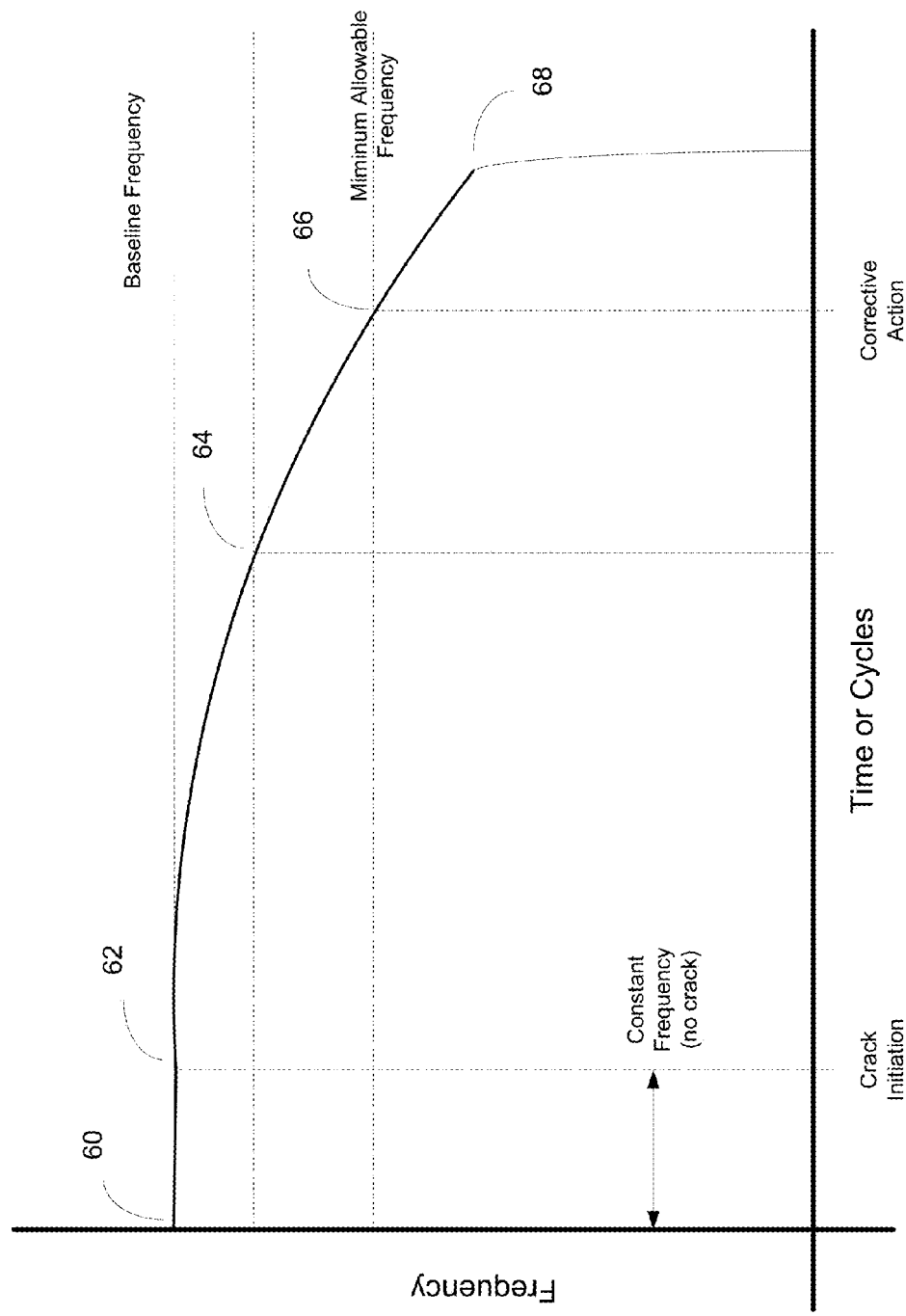
FIG. 2 shows an exemplary frequency trending analysis graph such as may be used in accordance with one embodiment of the invention.

FIG. 2 is a graph showing an exemplary relationship between a blade's vibration frequency and the length of time or number of start and stop cycles the blade undergoes. Tip timing is a method of measuring blade vibration frequency. Through the proper placement of sensors in a turbine engine's casing, a blade's actual arrival time may be precisely determined and compared to its anticipated arrival time. From this information taken at a number of locations around the circumference of the casing, the frequency of vibration of individual blades can be determined. As shown in FIG. 2, at 60, the blade has not been damaged and vibrates at a constant baseline frequency during operation of the turbine. During this time, the engine may undergo a number of start-stop cycles, and during each such cycle, the blade will exhibit resonant frequencies at various rotational speeds. However, in environments such as the generation of electrical power, where the engine operates at a constant speed other than during a start-stop cycle, the blade's resonant frequencies will not coincide with the engine's constant rotational speed and will be seen on sensors as having greater amplitudes only during a start-stop cycle. As long as there is no damage to the blade, such operational frequency characteristics may continue indefinitely. If a blade should suffer damage, either because of external factors or through normal stresses, the blade's vibration frequency will change. In FIG. 2, damage to the blade has occurred at 62 and thereafter the blade's vibrational frequency begins to decline. Once this occurrence is noted, the blade may be subjected to heightened scrutiny and monitoring, and the propagation and length of the crack may be followed as the blade frequency declines, as at 64. Using a frequency trending algorithm, the expected remaining blade life may be calculated in number of cycles or in time, depending upon the operating environment, and decisions regarding replacement or maintenance may be predicated upon such calculations. A minimum allowable frequency may be empirically determined, and when a blade's vibrational frequency reaches that threshold 66, corrective action must be taken. In the absence of corrective action, total failure of the blade may occur at any point 68, and predictions of the time or number of cycles remaining before total failure will become increasingly hazardous.

FIG. 3a depicts one form of blade clearance monitoring and analysis. Sensors installed in the casing will have determined a baseline radial clearance for each blade 70. If a blade has been slightly damaged, that fact may be evidenced by a gradual narrowing of the tip clearance 72 between the blade and the engine casing. If the narrowing occurs as depicted in FIG. 3a, actual contact between the blade tip and the casing ("blade tip rub") may be predicted, and maintenance can be preplanned. In an exemplary embodiment, sensors monitor clearances for occurrences of tip rubs 74. Tip rubs may adversely affect blade tip durability. Thus, monitoring the occurrences of tip rubs may help diagnose tip durability. The sensor data may be used alone or together with frequency trending or position trending data to diagnose and potentially schedule a technician to remove crack initiators caused by the tip rubs. Further, the system may store the effects of tip rub damage for future calculation and predictions.

FIG. 3b depicts blade clearance monitoring in which blade damage occurs suddenly 76, resulting in immediate rubbing of the blade against the casing. In this case, depending upon the severity of the tip rub, it may be necessary to immediately shut down the engine. Where emergency shutdown is not indicated, however, a review of frequency trending and position trending data can provide an analysis of the severity of the tip rub and possible crack formation, and will indicate the need for immediate or longer term maintenance.

A graph of position trending is shown in FIGS. 4a and 4b. Position trending tracks the variation in position of a blade while it is rotating, and provides information regarding potential damage to the blade. Position trending is highly useful when analyzed in conjunction with frequency trending, as a variation from a baseline in both position trending and frequency trending can provide information regarding the amount of twisting of the blade as contrasted with the length of a crack that may be in the blade. When this information is known, informed decisions can be made regarding the kind and severity of damage to a blade, and life expectancies may be based thereon.

As shown in FIG. 4a, where position trending shows that a blade's position is changing constantly over time from an initial position 80 to a series of intermediate positions 82, there may be continuing damage that will lead to a critical failure 84. In this case, cross-reference to frequency trending (as depicted in FIG. 2) may reveal that a crack is propagating (as would be expected if frequency is trending downward), and a non-scheduled maintenance shutdown to inspect and correct the condition may be required. Conversely, as is depicted in FIG. 4b, if a blade's position changes suddenly 86, but thereafter remains constant, a cross-reference to frequency trending may indicate that there are no cracks (as would be expected if there is no downward trend in frequency), or that any existing cracks are not propagating. In this case, it may be discovered that the blade has undergone non-critical distortion, and that damage is not progressing. In this case, the blade may be expected to perform satisfactorily until the next scheduled maintenance.

Figure 5:
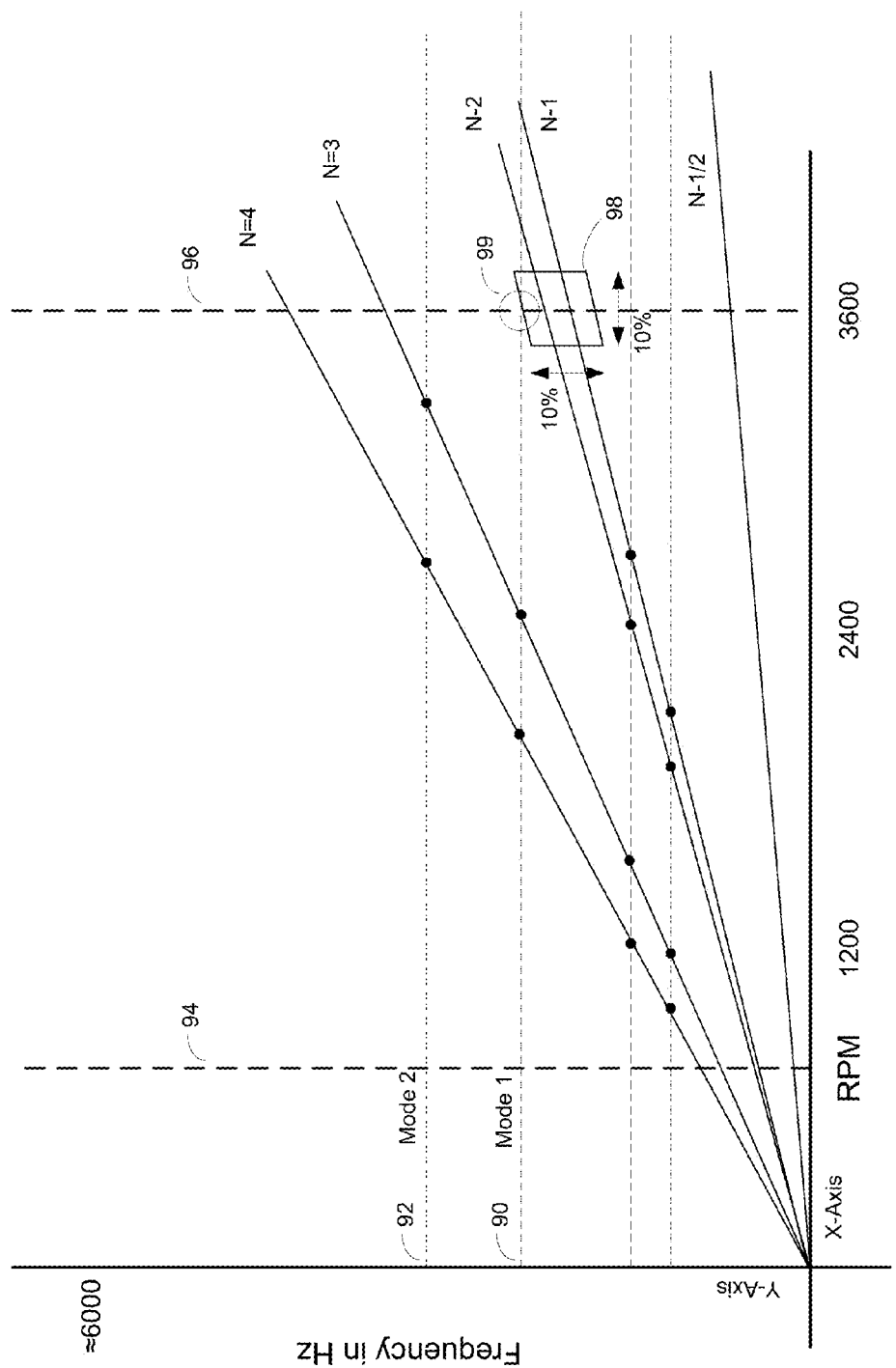
FIG. 5 depicts an exemplary Campbell Diagram on which resonant frequencies may be shown for different engine orders in accordance with one embodiment of the invention.

FIG. 5 depicts a representative Campbell Diagram which is used in analyzing damage tolerance. In FIG. 5, resonant blade frequencies in Hz are shown as horizontal lines intersecting the Y-axis as engine drivers. Modes 1 and 2 (90, 92) represent different ways (modes) in which a blade may be distorted (twisted, bent, flexed, etc.) at a particular resonant frequency. Vertical lines 94, 96 represent turbine speed in revolutions per minute (RPM) (shown on the X-axis), and indicate exemplary speeds at which the turbine engine may momentarily operate at a constant speed during startup or shutdown 94 or may run continuously during normal operation 96. If resonant frequencies should coincide with those constant engine speeds, damage to the blades may occur. Radial lines emanating from the origin represent engine orders—that is, resonant frequency responses that occur at various harmonics of engine RPM where n=½, 1, 2, 3, 4, etc. Blade damage may be expected to accumulate when the engine drivers on the Y-axis intersect the rotor RPM (X-axis) at a unique engine order or within a percentage margin. On the embodiment shown in FIG. 5, circle 99 indicates such an intersection of engine driver 90 with the engine's normal operational speed 96, and is considered to be a "keep out" zone during engine operation. If an engine order radial should intersect with an engine driver at a constant operational speed, such as at "keep out" zone 99, blade vibration frequencies would reach local peak amplitudes and add to the accumulation of damage to a blade. During startup and shutdown, as the engine speed necessarily passes through these frequencies, damage accumulation will occur to a greater or lesser extent, depending on how long the unit idles at those points.

In FIG. 5, engine orders N=1 and N=2 intersect with normal operational speed line 96 near engine driver 90 for mode 1. A margin box 98 extends in the horizontal (engine RPM) and vertical (blade vibration frequency) directions by an amount of 10% of the X and Y values. As depicted, engine orders N=1 and N=2 pass below "keep out" zone 99, and are not close enough to cause damage to a blade to accumulate under those operating conditions.

FIG. 5 is normally created from actual data obtained from an operating turbine engine. The data are used to measure vibration amplitude and number of vibration cycles for all responding modes, and to calculate stress intensities to determine crack growth resulting from each vibration cycle and amplitude. An algorithm for damage accumulation measures and records vibration amplitude and number of vibration cycles for all responding modes. Vibration stresses are calculated and are used to determine fatigue damage resulting from each vibration cycle and amplitude. Damage due to vibration is summed over time and corrective action time is projected from the measured rates of damage accumulation. In addition, incremental crack propagation is summed over time and corrective action may be projected from crack growth rates and prediction of critical crack length. In this manner, the damage tolerance of a blade can be determined, and decisions made regarding maintenance or replacement.

Figure 6:
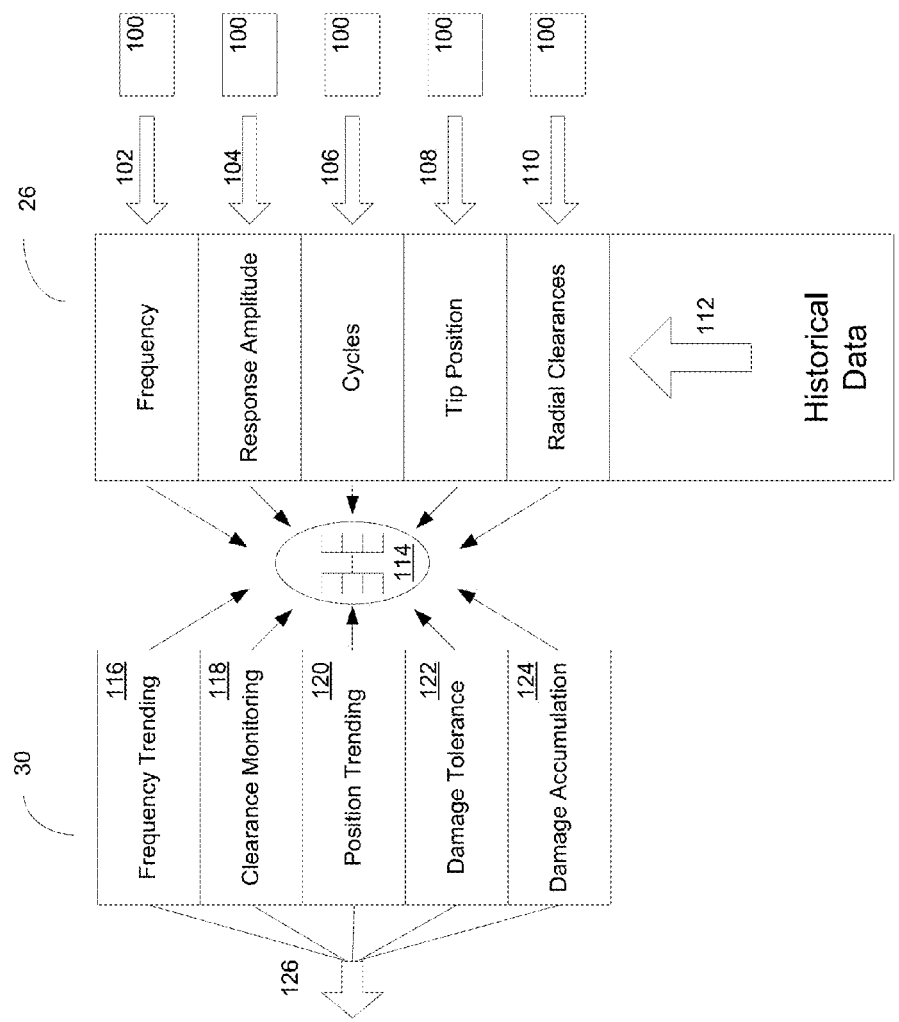
FIG. 6 is a graphical depiction in accordance with one embodiment of the invention, showing the movement of data through the system.

FIG. 6 provides a graphic representation of the system of this invention in accordance with one embodiment. The system comprises sensors 100 that gather ATA information in real time and provide it to ATA system processes that enter relevant parameters into the database 26. ATA system processes include determinations of blade vibration frequency 102, resonant response amplitudes 104, number of startup and shutdown cycles 106, blade tip positions 108, and blade tip radial clearances 110. Historical data 112 is provided, and the information is sent to a processing module 114 where the algorithms are applied to determine frequency trending 116, clearance monitoring 118, position trending 120, damage tolerance 122, and damage accumulation 124. Results of these analyses are then provided to other systems 126 for monitoring and any necessary actions.

Figure 7:
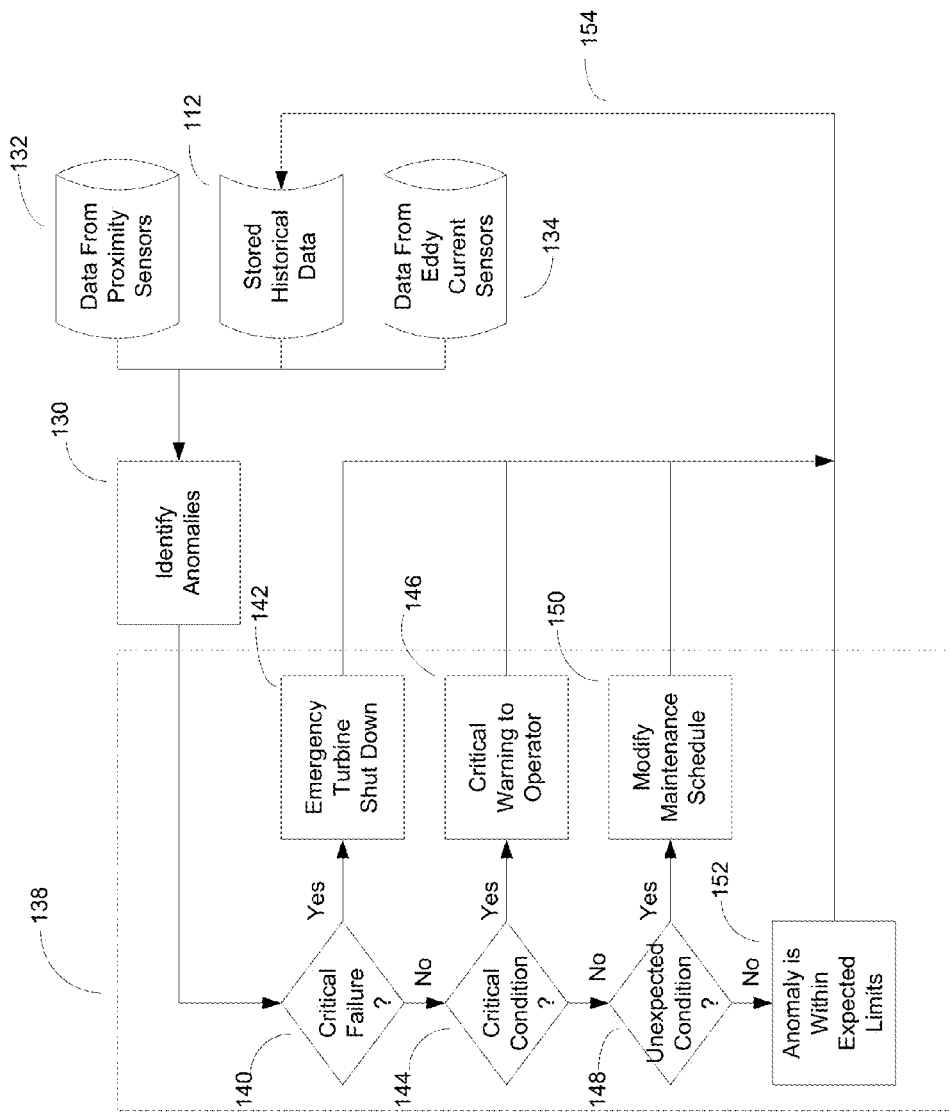
FIG. 7 is a flow chart in accordance with one embodiment of the invention, showing the process of detecting, identifying, and acting upon information relating to blade health.

FIG. 7 is a flow chart of an embodiment showing how identified anomalies in blade health may be processed. At 130, data from sensors is received and compared with historical data to determine whether real-time information is within historical limits. For example, data may be provided from proximity sensors 132, from eddy current sensors 134, and from stored historical data 112. While proximity and eddy current sensors are specifically noted, it is possible that other kinds of sensors may exist or may be developed that will provide blade position, shape, frequency, and clearance information, and such sensors and information would fall within the scope of the invention. Anomalies identified at 130 are then sent to a processing unit 138 to determine the severity of the anomaly, based on a further analysis of the data. Actions may be taken based on the analysis. At 140, if a critical failure is indicated, an emergency shutdown of the engine 142 may be instructed. Normally, an emergency shutdown will be automated, without human intervention, and would be done in circumstances where the engine is subject to imminent failure and would be expected to self-destruct if immediate shutdown is not done. If the anomaly is not a critical failure, the system then checks for the presence of a critical condition 144. If a critical condition is detected, a critical warning is sent to the operator 146, but further action may depend upon human intervention by the operator. In the event that the anomaly is of an unexpected, but not critical, condition 148, the system may modify the maintenance schedule 150 for the engine to have the unexpected condition reviewed or corrected at a time when the engine can be shut down without causing a disruption of the system. If the anomaly is abnormal but otherwise within acceptable limits 152, no action is taken. In all cases, both the anomaly and any consequent actions are recorded back into the database as historical data 154.

In some embodiments, when anomalies are detected, the system may also check inventory for turbine parts needing repair or when the parts are not available may automatically place orders for the non-available parts. In an embodiment of the subject matter disclosed herein, the system may schedule hardware inspection and blade repair specialists for inspection of the damaged rotor blade. The system may also catalog every action for future references to data and actions performed by the system. In yet another embodiment, the system may be configured to allow manual correction, overwriting, or editing of any action.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While aspects of the invention described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method of monitoring rotor blades in an operating turbine combustion engine comprising the steps of:
   positioning a plurality of sensors around a plurality of rotor blades in a stage of a combustion turbine engine;
   collecting and storing information in a memory regarding the relative position of each blade in said plurality of rotor blades when said rotor blades are in an undamaged condition;
   said sensors detecting and transmitting to a processor the times of passage of one or more of said rotor blades in said stage during operation of the turbine combustion engine;
   determining the physical condition and orientation of said one or more rotor blades by comparing the anticipated arrival times of one or more blades with actual arrival time information transmitted from said plurality of sensors;
   analyzing said information transmitted from said plurality of sensors to identify and count the cycles in which each of said one or more rotor blades experiences resonant frequencies;
   recording and storing in a memory the number of cycles and the frequencies and amplitudes of vibration for each resonant frequency;
   comparing recent information with historical information to develop a prediction, based upon the frequencies and peak amplitudes of vibration of the number of cycles said one or more rotor blades may be expected to experience before failure;
   using said prediction to schedule events relating to said turbine engine, said events including at least scheduled maintenance.

2. The method of claim 1, wherein said plurality of sensors includes eddy current sensors and proximity sensors.

3. The method of claim 1 wherein said step of determining the physical condition and orientation of said one or more rotor blades further comprises the steps of determining and recording an expected arrival time for different parts of a blade whose physical condition and orientation are being determined, and comparing said expected arrival times with actual arrival times for each of said parts of said blade.

4. The method of claim 2 further comprising the steps of positioning said sensors within a casing surrounding said blades and analyzing information from said proximity sensors to monitor the clearance between a blade and said casing for one or more of said blades.

5. The method of claim 3 wherein the step of positioning a plurality of sensors around a plurality of rotor blades in a stage of a combustion turbine engine further comprises positioning said sensors around the circumference of said blades' path of rotation such that expected and actual arrival times for parts of each blade can be analyzed to identify deformations in the shape of each blade and to determine the frequency of vibration of each blade during the operation of said combustion turbine engine.

6. The method of claim 5 further comprising analyzing said blade vibration frequencies to determine frequency trending for one or more of said blades.

7. The method of claim 6 further comprising analyzing blade vibration frequencies and blade actual and anticipated arrival times to determine position trending for one or more of said blades.

8. The method of claim 7 further comprising analyzing blade damage to determine damage accumulation to one or more blades.

9. The method of claim 8, wherein said prediction of the number of cycles each said blade in a first combustion turbine engine may be expected to perform before failure is based upon empirically collected data related to the performance of blades in other combustion turbine engines of the same model as said first combustion turbine engine, and in which blade damage is similar to the damage to blades in said first combustion turbine engine.

10. The method claimed in claim 8, further comprising determining expected blade life by analyzing damage accumulation for each cycle and determining a predicted blade failure if said damage accumulation continues at the same rate.

11. The method claimed in claim 10 wherein information regarding damage to one or more blades is stored in a database and made accessible for analyses to be performed in the future.

12. A system for monitoring rotor blades in an operating turbine combustion engine, said system comprising:
   a plurality of sensors positioned around a plurality of rotor blades in a stage of a combustion turbine engine;
   a memory collecting and storing information regarding the relative position of each blade in said plurality of rotor blades when said rotor blades are in an undamaged condition;
   a processor receiving information transmitted from said plurality of sensors indicative of times of passage of one or more of said rotor blades in said stage during operation of the turbine combustion engine;
   wherein said processor is operative to determine the physical condition and orientation of said one or more rotor blades by comparing anticipated arrival times of one or more blades with actual arrival time information transmitted from said plurality of sensors and to analyze said information transmitted from said plurality of sensors to identify and count the cycles in which each of said one or more rotor blades experiences resonant frequencies;
   wherein said memory is operative to record the number of cycles and the frequencies and amplitudes of vibration for each resonant frequency; and wherein said processor is operative to compare recent information with historical information to develop a prediction based upon the frequencies and peak amplitudes of vibration of the number of cycles said one or more rotor blades may be expected to experience before failure and, using said prediction, to schedule events relating to said turbine engine, said events including at least scheduled maintenance.

13. The system of claim 12 wherein said plurality of sensors includes eddy current sensors and proximity sensors.

14. The system of claim 12 wherein said processor is further operative to determine an expected arrival time for different parts of a blade whose physical condition and orientation are being determined, and to compare said expected arrival times with actual arrival times for each of said parts of said blade.

15. The system of claim 12 wherein said processor is further operative to analyze blade damage to determine damage accumulation to one or more blades.

16. The system of claim 12 wherein said events include scheduling a shutdown of said turbine engine prior to failure of said one or more blades.

17. The system of claim 14 wherein said sensors are positioned around the circumference of said blades' path of rotation such that expected and actual arrival times for parts of each blade can be analyzed to identify deformations in the shape of each blade and to determine the frequency of vibration of each blade during the operation of said combustion turbine engine.

18. The system of claim 15 wherein said processor is further operative to determine expected blade life by analyzing damage accumulation for each cycle and to determine a predicted blade failure if said damage accumulation continues at the same rate.

19. The system of claim 17 wherein said processor is further operative to analyze said frequency of vibration to determine frequency trending for one or more of said blades.

20. The system of claim 18 wherein said memory is further operative to store information regarding damage to one or more blades in a database and to make said information regarding damage accessible for analyses to be performed in the future.

* * * * *